(12) United States Patent
Ter Borgh

(10) Patent No.: US 10,709,104 B2
(45) Date of Patent: Jul. 14, 2020

(54) BARN FLOOR CLEANER

(71) Applicant: Berend Hindrik Ter Borgh, Calmar (CA)

(72) Inventor: Berend Hindrik Ter Borgh, Calmar (CA)

( * ) Notice: Subject to any disclaimer, the term of this patent is extended or adjusted under 35 U.S.C. 154(b) by 77 days.

(21) Appl. No.: 16/114,941

(22) Filed: Aug. 28, 2018

(65) Prior Publication Data

US 2020/0068844 A1 Mar. 5, 2020

(51) Int. Cl.
*A01K 1/01* (2006.01)
*E01H 1/05* (2006.01)
*E01H 1/10* (2006.01)

(52) U.S. Cl.
CPC ........... *A01K 1/0128* (2013.01); *E01H 1/053* (2013.01); *E01H 1/105* (2013.01)

(58) Field of Classification Search
CPC ........ A01L 1/0128; E01H 1/053; E01H 1/105
See application file for complete search history.

(56) References Cited

U.S. PATENT DOCUMENTS

| | | | | |
|---|---|---|---|---|
| 3,189,932 | A * | 6/1965 | Daneman | E01H 1/106 |
| | | | | 15/340.3 |
| 4,290,820 | A * | 9/1981 | Swisher, Jr. | E01C 23/08 |
| | | | | 134/21 |
| 6,446,298 | B1 * | 9/2002 | Berg, Jr. | A01K 1/0132 |
| | | | | 119/451 |
| 6,675,424 | B2 * | 1/2004 | Smith | E01H 1/047 |
| | | | | 15/340.4 |
| 8,418,777 | B1 * | 4/2013 | Grossen | E02F 3/7668 |
| | | | | 172/799.5 |
| 8,657,384 | B1 * | 2/2014 | Fraley | E21C 25/00 |
| | | | | 299/36.1 |
| 9,060,659 | B2 * | 6/2015 | Lu | A47L 9/009 |
| 10,378,176 | B2 * | 8/2019 | Mason | E02F 3/7618 |

(Continued)

FOREIGN PATENT DOCUMENTS

| | | |
|---|---|---|
| CN | 202865784 U | 4/2013 |
| CN | 202949823 U | 5/2013 |

(Continued)

OTHER PUBLICATIONS http://www.yhroad.com/product/Road_Sweeper/139.html.

(Continued)

*Primary Examiner* — Marc Carlson
(74) *Attorney, Agent, or Firm* — Bennett Jones LLP

(57) ABSTRACT

An apparatus is provided for cleaning a floor, and in particular a barn floor having a lower portion and an elevated portion that intersect to form a curb. The apparatus is attached to a vehicle that travels in a longitudinal direction. The apparatus includes a scraper for scraping the lower portion of the floor. The scraper is pivotally attached to the vehicle for adjusting a transverse position of an end of the scraper into abutment with the curb. The apparatus also includes a cleaning head for moving material from the elevated portion of the floor. The cleaning head is attached to an arm. The arm is pivotally attached to the scraper for adjusting a transverse position of the cleaning head into alignment with the elevated portion of the floor. The cleaning head is actuated to sweep material transversely into the path of the scraper as the vehicle moves in the longitudinal direction.

22 Claims, 15 Drawing Sheets

(56) References Cited

U.S. PATENT DOCUMENTS

| | | | |
|---|---|---|---|
| 10,508,395 B1 * | 12/2019 | Madden | E01H 1/02 |
| 2005/0102778 A1 * | 5/2005 | Gregerson | E01H 1/053 |
| | | | 15/82 |
| 2009/0293220 A1 * | 12/2009 | Mensch | E01H 1/106 |
| | | | 15/340.1 |

FOREIGN PATENT DOCUMENTS

| | | | |
|---|---|---|---|
| DE | 4444508 C1 | 2/1996 | |
| DE | 19745887 C2 | 4/2000 | |
| EP | 1895056 A2 * | 3/2008 | E01H 1/045 |

OTHER PUBLICATIONS https://www.tennantco.com/en_ca/1/machines/sweepers/product.636.green-machines-compact-air-sweeper.M636.html.
https://urban-sweeper.com/en/configurator.
http://www.jydeland.dk.

* cited by examiner

BARN FLOOR CLEANER

FIELD OF THE INVENTION

The present invention relates to apparatuses and methods for cleaning floors, and in particular barn floors that have a walkway between a pair of raised stall floors.

BACKGROUND OF THE INVENTION

Clean barn floors help prevent dairy cows from developing mastitis (inflammation of the udder), which can negatively affect milk production. Ideally, barn floors should be cleaned during the limited window of time when the stalls are vacant.

The prior art includes apparatuses for cleaning barn floors. German patent DE444450, 518 (Moser et al., Feb. 29, 1996) discloses a system for cleaning a livestock stall that includes a pair of scraper bars that are pulled by cables to remove manure from a base plate of the stall. Chinese utility model CN202949823 (Liu, May 29, 2013) discloses a system that includes scraper plates that are driven to slide within grooves of a barn to clean excrement accumulated with the grooves. The Bobman SL™ (Jydeland Maskinfabrik A/S, Ebeltoft, Denmark) is a stall cleaning machine that includes a powered three-wheeled cart, with an arm that pivots from the side of the cart to deploy a rotary brush. A curb scraper extends the width of the cart, and is positioned beneath the cart, and aft of the rotary brush. A hopper for carrying bedding material has a side-discharge chute for placing the bedding material on the stall floor.

The prior art also includes apparatuses for sweeping roads. German patent DE19745887 (Schneider, Apr. 27, 2000) discloses a carrier with a motor-driven cylindrical brush and a clearing blade that can be adjusted horizontally in the longitudinal direction of the brush, relative to the brush. U.S. patent application publication US2005102778 (Gregerson, May 19, 2005) discloses a rotary brush and gutter broom assembly that is mounted in front of a skid steer. A yaw pivoting joint allows a frame that supports the brush and the gutter broom to rotate about a vertical axis. Chinese utility model CN202865784 (Luo, Apr. 4, 2013) discloses a road sweeper with a pair of rotary side brooms.

None of the foregoing apparatuses is specifically suited to cleaning the configuration of barn floors commonly found in barns for dairy cows. Such barn floors include an elongate walkway with at least one adjacent raised stall floor, which forms a curb with the walkway. The walkway may be disposed between a pair of raised stall floors in a "tail-to-tail" arrangement. The walkway is typically about 2.4 meters (8 feet) to 4.5 meters (15 feet) feet wide, and the curb is typically about 15 cm (6 inches) to about 30 cm (12 inches) tall. The stall floors are typically about 2.4 meters (8 feet) to 3.0 meters (10 feet) wide, but only the rear portion of the stall floors need to be cleaned. The stall floors are typically inclined downwardly toward the walkway to allow for drainage.

There remains a need in the art for an apparatus for simultaneously cleaning the entirety of the walkway and the rear portions of a pair of raised stall floors as described above. Preferably, such an apparatus is adaptable for cleaning walkway and stall floors of different dimensions, readily maneuverable within the walkway, provides good visibility for an operator, allows for convenient loading and discharge of bedding material, and allows for convenient servicing of the apparatus.

SUMMARY OF THE INVENTION

In one aspect, the present invention comprises an apparatus for cleaning a floor. The apparatus is attached or attachable to a vehicle that defines a horizontal longitudinal direction of travel, and a horizontal transverse direction perpendicular to the longitudinal direction. The apparatus comprises a scraper assembly comprises at least one horizontally extending scraper for scraping material on the floor. When the apparatus is attached to the vehicle, the scraper is pivotable in relation to the vehicle for adjusting a transverse position of an end of the scraper in relation to the vehicle. The apparatus also includes, for at least one scraper, an associated cleaning head assembly. The cleaning head assembly comprises a cleaning head that is actuable for moving material on the floor from a position transversely offset from the scraper to a position transversely aligned with and longitudinally in front of the scraper, and a horizontally extending aim attached to the cleaning head. The arm is pivotally attached to the scraper for adjusting a transverse position of the cleaning head in relation to the scraper.

In one embodiment of the apparatus, the at least one scraper comprises a left scraper and a right scraper. The left and right scrapers are pivotable in relation to the vehicle to position the end of the left scraper and the end of the right scraper transversely on opposite sides of the vehicle. The left and right scrapers may be pivotable in relation to the vehicle to at least partially overlap the left and the right scraper in a longitudinal plane. The scraper assembly may further comprise a central scraper, wherein the left scraper and the right scraper are pivotable in relation to the vehicle by being pivotally attached to the central scraper.

In one embodiment of the apparatus, the cleaning head comprises a rotary brush.

In one embodiment of the apparatus, the arm is pivotable into substantially collinear alignment with the scraper in a vertical plane.

In one embodiment of the apparatus, the apparatus further comprises, for each of the at least one scraper, a scraper actuator for pivoting the scraper in relation to the vehicle for adjusting the transverse position of the end of the scraper in relation to the vehicle.

In one embodiment of the apparatus, the apparatus further comprises a first arm actuator for pivoting the arm in relation to the attached scraper for adjusting the transverse position of the rotary brush in relation to the scraper.

In one embodiment of the apparatus, the arm is pivotally attached to the scraper for adjusting a vertical position of the rotary brush in relation to the scraper. The apparatus may further comprise a second arm actuator for pivoting the arm in relation to the scraper for adjusting the vertical position of the rotary brush in relation to the scraper.

In one embodiment of the apparatus, when the apparatus is attached to the vehicle, the scraper assembly is movable in relation to the vehicle for adjusting a vertical position of the scraper assembly in relation to the floor. The apparatus may further comprise a scraper assembly actuator for moving the scraper assembly in relation to the vehicle for adjusting the vertical position of the scraper assembly in relation to the floor.

In one embodiment of the apparatus, when the apparatus is attached to the vehicle, the scraper assembly and the cleaning head assembly are positioned longitudinally in front of an operator cab of the vehicle.

In one embodiment of the apparatus, the apparatus further comprises a hopper for storing material to be distributed on the floor. When the apparatus is attached to the vehicle, the hopper is pivotable in relation to the vehicle for adjusting an orientation of the hopper between a substantially horizontal orientation and a substantially vertical orientation. When the hopper is in the substantially vertical orientation, an edge of the hopper may engage the floor.

In one embodiment of the apparatus, the vehicle turns by differential speed between a pair of transversely spaced apart wheels.

In one embodiment of the apparatus, the apparatus further comprises the vehicle attached to the apparatus. The operator cab may be pivotable in relation to another portion of the vehicle between a substantially horizontal orientation and a substantially vertical orientation In another aspect, the present invention comprises a method for cleaning a floor. The method comprises the steps of:

(a) providing an apparatus attached to a vehicle defining a horizontal longitudinal direction of travel, and a horizontal transverse direction perpendicular to the longitudinal direction, wherein the apparatus comprises:
  (i) at least one elongate scraper for scraping material on the floor; and
  (ii) for at least one scraper: a cleaning head actuable for moving material on the floor from a first position transversely offset from the scraper to a second position transversely aligned with and longitudinally in front of the scraper; and an arm attaching the cleaning head to the scraper;
(b) pivoting the at least one scraper in relation to the vehicle to adjust a transverse position of an end of the scraper;
(c) pivoting the arm in relation to the scraper to adjust a transverse position of the cleaning head in relation to the scraper; and
(d) actuating the cleaning head to sweep material on the floor from the first position to the second position, and moving the vehicle in the longitudinal direction so that the scraper scrapes material on the floor at the second position.

In one embodiment of the method, the cleaning head comprises a rotary brush.

In one embodiment of the method, the step of pivoting the at least one scraper is performed to abut the end of the scraper with a curb formed by an intersection of a lower portion of the floor surface and an elevated portion of the floor. The step of pivoting the arm in relation to the scraper may be performed to align the cleaning head with the elevated portion of the floor.

In one embodiment of the method, the at least one scraper comprises a left scraper and a right scraper.

In one embodiment of the method, the method further comprises pivoting the left scraper and the right scraper to at least partially overlap each other in a longitudinal plane.

In one embodiment of the method, the method further comprises pivoting the arm into substantially collinear alignment with the scraper in a vertical plane.

In one embodiment of the method, the method further comprises pivoting the arm in relation to the scraper to adjust a vertical position of the cleaning head in relation to the floor.

In one embodiment of the method, the method further comprises adjusting a vertical position of the scraper in relation to the floor.

In one embodiment of the method, the vehicle comprises an operator cab, and the scraper and the cleaning head assembly are positioned longitudinally in front of the operator cab.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

DETAILED DESCRIPTION OF EMBODIMENTS OF THE INVENTION

Definitions. Any term or expression not expressly defined herein shall have its commonly accepted definition understood by a person skilled in the art.

"Vehicle" as used herein refers to any mechanical device that can move horizontally in relation to a floor, irrespective of the nature of the prime mover of the vehicle. Non-limiting examples of vehicles include wheeled or tracked vehicles such as carts, tractors, and skid-steers. A vehicle may or may not require an operator onboard the vehicle. A vehicle may be remotely controlled. A vehicle may be manually operated, or may be partly- or fully-autonomous in operation.

"Longitudinal" as used herein refers to the horizontal direction that is substantially aligned with the primary horizontal direction of travel of a vehicle. "Transverse" as used herein refers to the horizontal direction that is substantially perpendicular to the longitudinal direction.

"Actuator" as used herein refers to any powered mechanical device that may be used to move the apparatus of the present invention, or a part thereof, in response to a signal from a control system. As non-limiting examples, an actuator may be powered by mechanical movement, electricity, hydraulic fluid pressure, or pneumatic pressure.

"Scraper" as used herein refers to any device that can be used to push material along a floor as the device is moved along the floor. A part of the scraper that engages the floor may be smooth and flat so as to conform to flat floor, or contoured (e.g., a serrated or saw tooth shape). The scraper may be rigid so that it firmly engages the floor without any substantial deformation of the scraper (e.g., a scraper in the form of a metal blade), or, the scraper may be flexible so that the edge can be biased against the floor by deformation of the scraper (e.g., a scraper in the form of a flexible rubber blade).

"Cleaning head" as used herein refers to any device having one or more cleaning elements that can be moved in relation to floor to move material on the floor from the cleaning element to a location spaced apart from the cleaning elements. As non-limiting examples, a cleaning head may comprise cleaning elements in the form of flexible or rigid bristles, wire, or filaments (e.g., a broom or a brush), cleaning elements made of an absorbent material in the form of strands, fibers, or sheets (e.g., a mop), cleaning elements in the form of a pad or a disc, or cleaning elements in the form of a toothed rake. A cleaning head may be actuated to move in relation to the floor in a variety of ways. As non-limiting examples, a cleaning head may be rotated or oscillated in relation to the floor.

Figure 1:
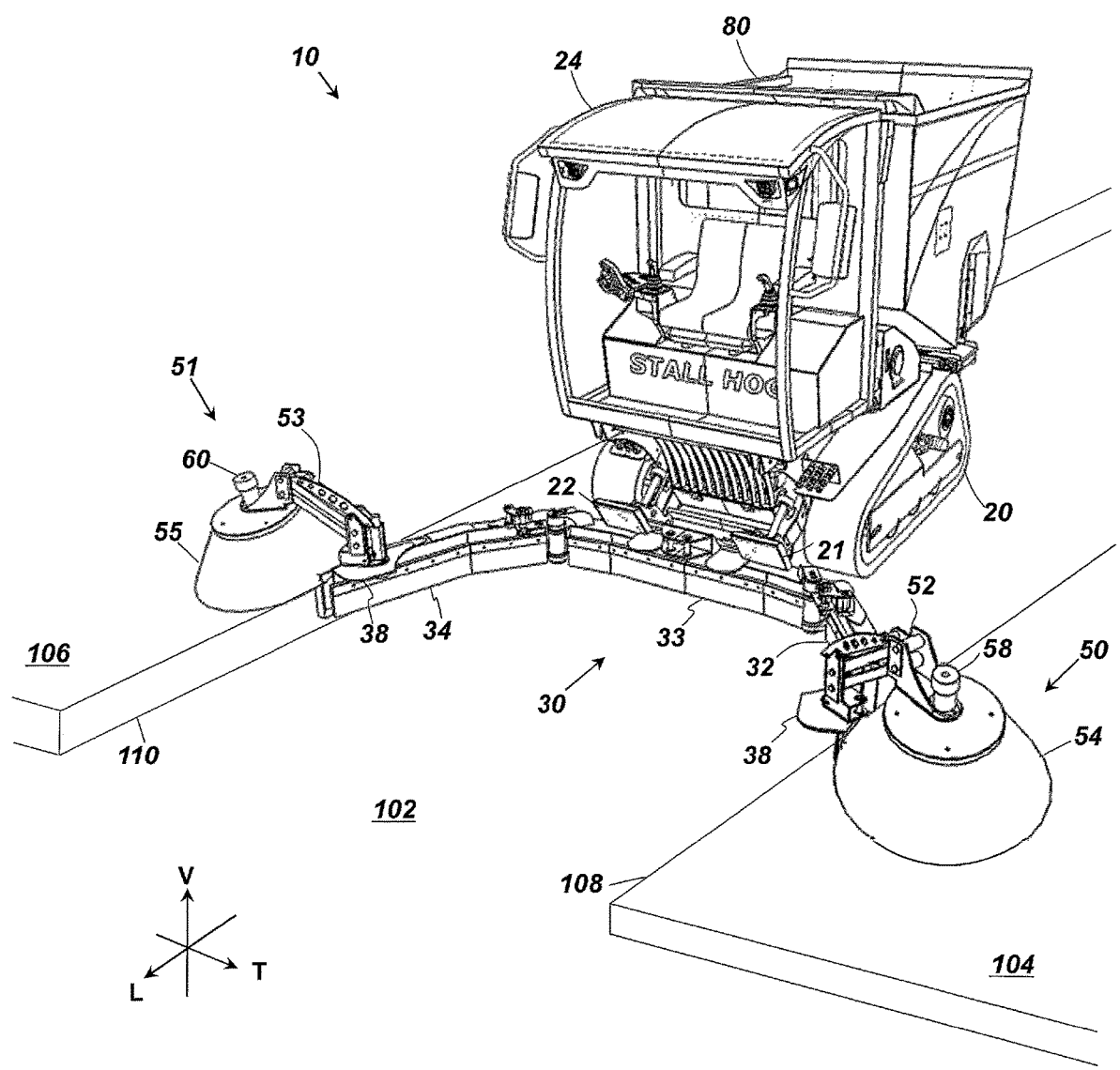
FIG. 1 shows a left front quarter perspective view of an embodiment of an apparatus for cleaning barn floors, of the present invention, when cleaning two barn stall floors separated by a walkway.
Figure 2:
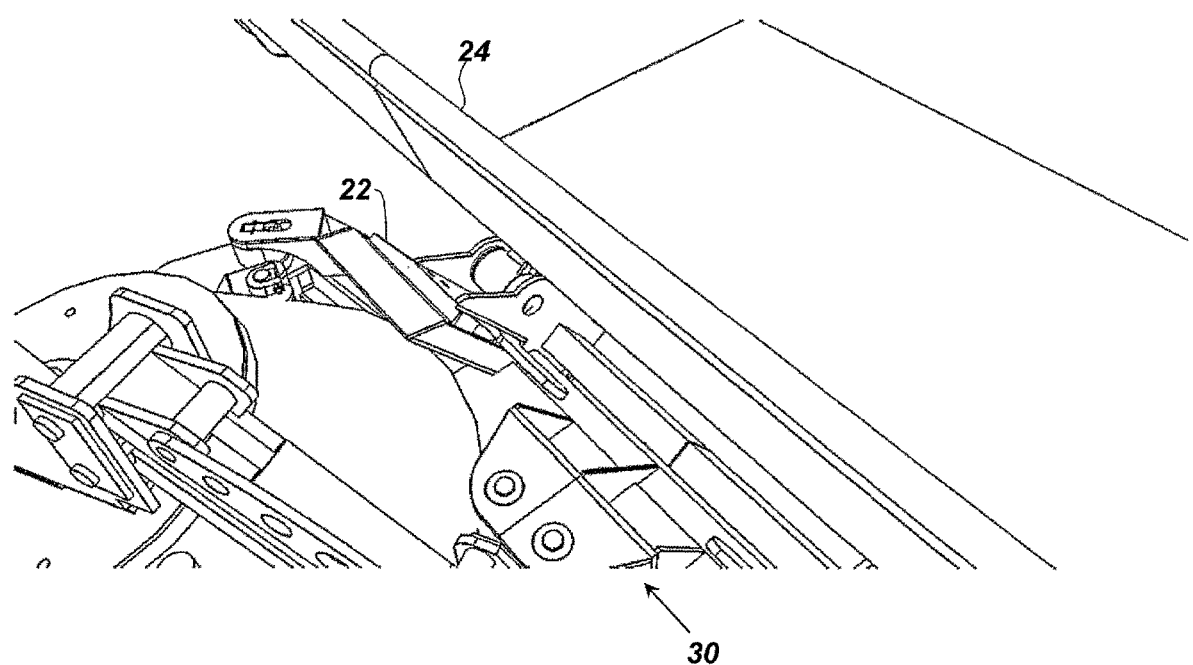
FIG. 2 shows a top left front perspective view of the connection of the scraper assembly to the skid steer, for the apparatus of FIG. 1.

Apparatus. FIG. 1 shows an embodiment of an apparatus (10) of the present invention. In this embodiment, the apparatus (10) includes a vehicle (20), a scraper assembly (30), which is used to scrape material from a walkway (102) as the vehicle (20) travels forward in the longitudinal direction (L). The scraper assembly (30) is associated with a pair of cleaning head assemblies in the form of rotary brush assemblies (50, 51), which are used to clean material on the floor (100) as the vehicle (20) travels in the longitudinal direction. In this embodiment, the apparatus (10) also includes a hopper (80) that is used for storing material and distributing bedding material to floors (104, 106). These and other parts of the apparatus (10), and their use and operation, are described in greater detail below.

Vehicle. In the embodiment shown in FIG. 1, the vehicle (20) generally travels in a forward horizontal longitudinal direction denoted by the axis (L), while the horizontal transverse direction (i.e., to the left and right of the vehicle (20)) is denoted by the axis (T), and the vertical direction is denoted by the axis (V). In the embodiment shown in FIG. 1, the vehicle (20) is a skid steer, which turns by differential speed between a pair of transversely spaced apart tracked wheels. Use of a skid steer may be advantageous in that its turning radius may be smaller than that of a steered wheel vehicle of a similar size. In other embodiments, the apparatus (10) may be attached to other types of vehicles, as described above.

Scraper assembly. In the embodiment shown in FIG. 1, the scraper assembly (30) has a left scraper (32), a central scraper (33) and a right scraper (34). In the embodiment shown in FIG. 1, the central scraper (33) has a length that is slightly less than the transverse width of the vehicle (20), while the left scraper (32) and the right scraper (34) have lengths similar to the transverse width of the vehicle (20). In other embodiments, the scraper assembly (30) may have only one scraper, or a different number of scrapers, of different dimensions.

Figure 3:
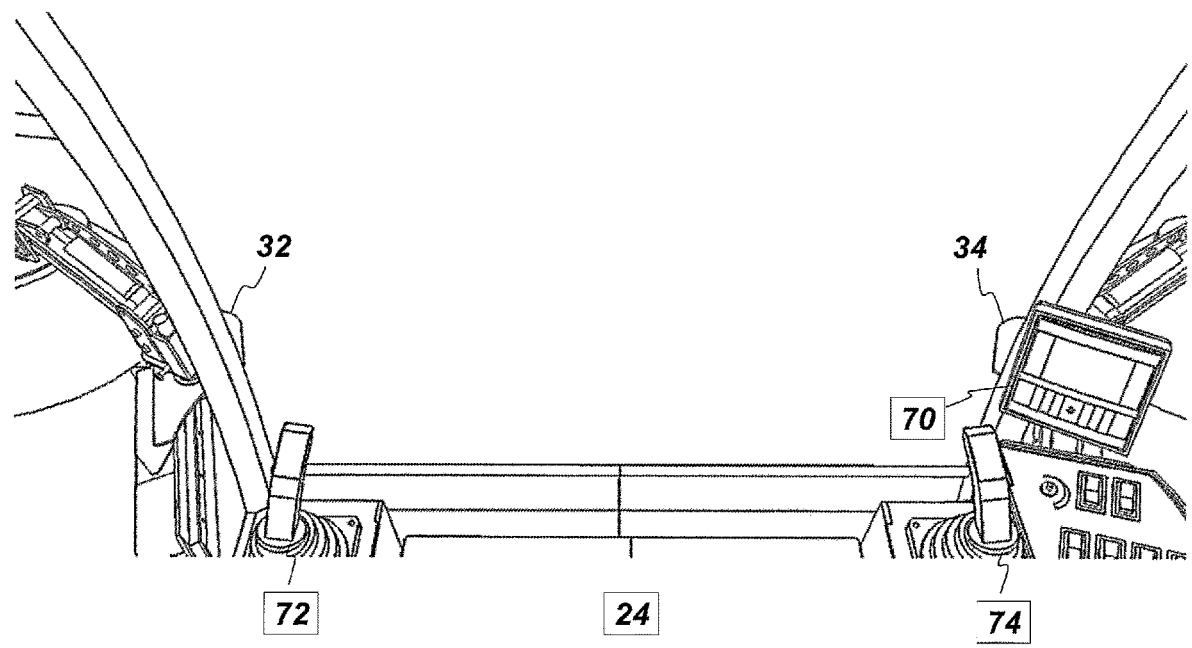
FIG. 3 shows a view from an operator cab of the apparatus of FIG. 1.

In this embodiment, the central scraper (33) is attached to the vehicle (20) by a left universal skid steer bracket (21) and a right universal skid steer bracket (22), respectively. Accordingly, as shown in FIG. 3, the scraper assembly (30) and the associated rotary brush assemblies (50, 51) extend longitudinally in front of an operator cab (24) of the vehicle (20), and can be readily seen from the perspective of the operator cab (24). Further, the scraper assembly (30) may be conveniently detached from the vehicle (20), and allow the vehicle (20) to be used for purposes other than floor cleaning. In other embodiments, the scraper assembly (30) may be permanently or removably attached, in whole or in part to other parts of the vehicle (20) (e.g., beneath the vehicle (20), or on the side of the vehicle (20)), using other suitable fastening mechanisms known in the art.

Figure 4:
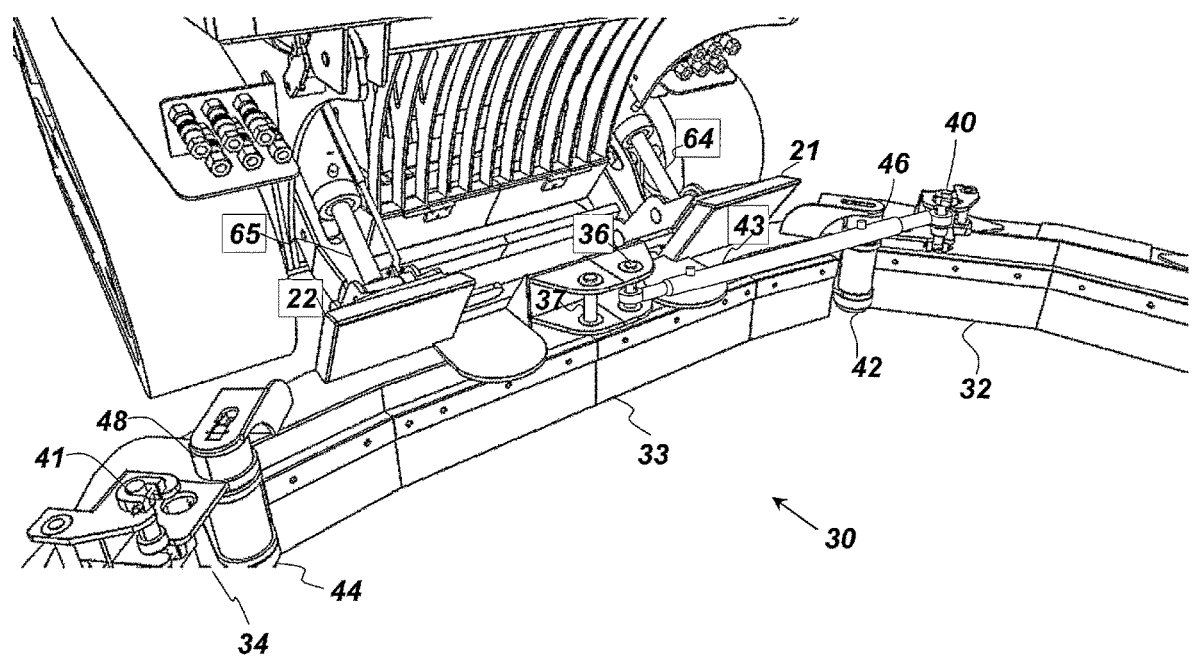
FIG. 4 shows a front right quarter perspective view of the scraper assembly of the apparatus of FIG. 1.
Figure 5:
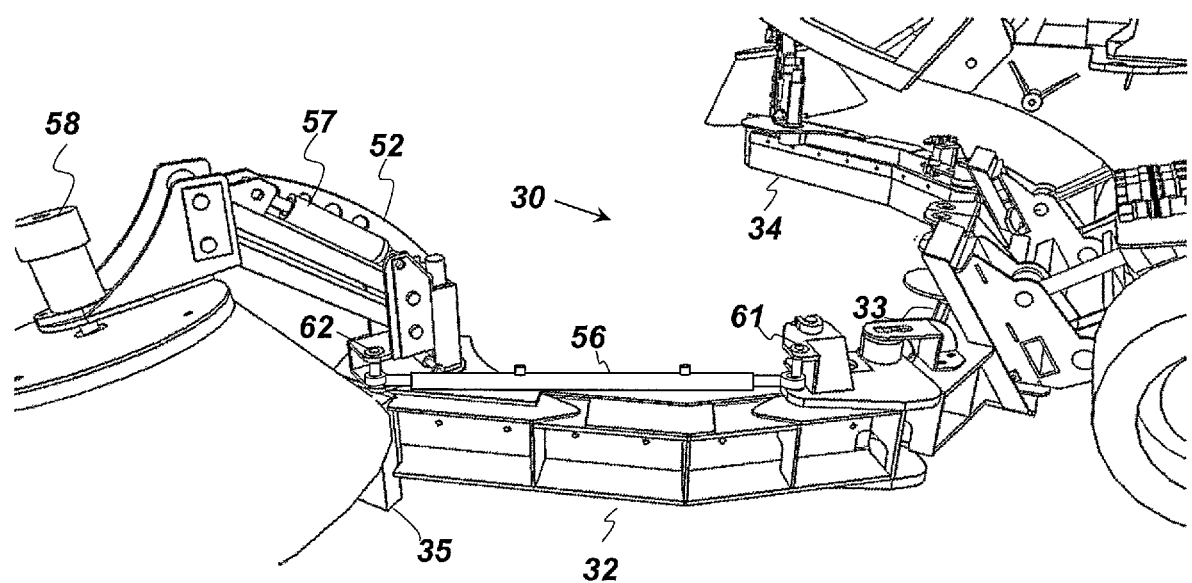
FIG. 5 shows a top left quarter perspective view of the scraper assembly of the apparatus of FIG. 1.

In this embodiment, as shown in FIGS. 4 and 5, the left scraper (32) extends from a scraper proximal end pivotally attached by a pin connection (42) to the left end of the central scraper (33), to a scraper distal end. Similarly, the right scraper (34) extends from a scraper proximal end pivotally attached by a pin connection (44) to the right end of the central scraper (33), to a scraper distal end. The pin connections (42, 44) allow the left scraper (32) and the right scraper (34) to pivot about substantially vertical axes, thereby adjusting the transverse position of the scraper distal ends in relation to the vehicle (20) and the effective transverse width of the scraper assembly (30).

The scraper assembly (30) may include scraper actuators for pivoting the scrapers in relation to the vehicle (20). In this embodiment, as shown in FIG. 4, a left scraper actuator (43) effects pivoting of the left scraper (32). In this embodiment, the left scraper actuator is in the form of a linear hydraulic actuator (e.g., a hydraulic cylinder (43)) with a proximal end pivotally attached to a pin connection (36) of the central scraper (33) and a distal end pivotally attached to a pin connection (40) of the left scraper (32). Extension and retraction of the hydraulic cylinder (43) causes pivoting of the left scraper (32) in relation to the central scraper (33). An analogous right scraper actuator (not shown for clarity) is similarly attached to the pin connection (37) of central scraper (33) and to the pin connection (41) of the right scraper (34) to effect pivoting of the right scraper (34) in relation to the central scraper (33). In other embodiments, other types of scraper actuators may be used. For example, in an alternative embodiment, the scraper actuators may comprise hydraulic rotary actuators or electromechanical motors. In this embodiment, the pin connections (40, 41) comprise U-bushings and shear bolts. If the scrapers (32, 34) are hooked behind an obstacle while the vehicle (20) is moving, the shear bolts are intended to break and release the left scraper (32) and the right scraper (34) before excessive forces are applied to the rest of the scraper assembly (30), the vehicle (20) and the hydraulic cylinder (43), thereby preventing damage to these components.

Figure 6:
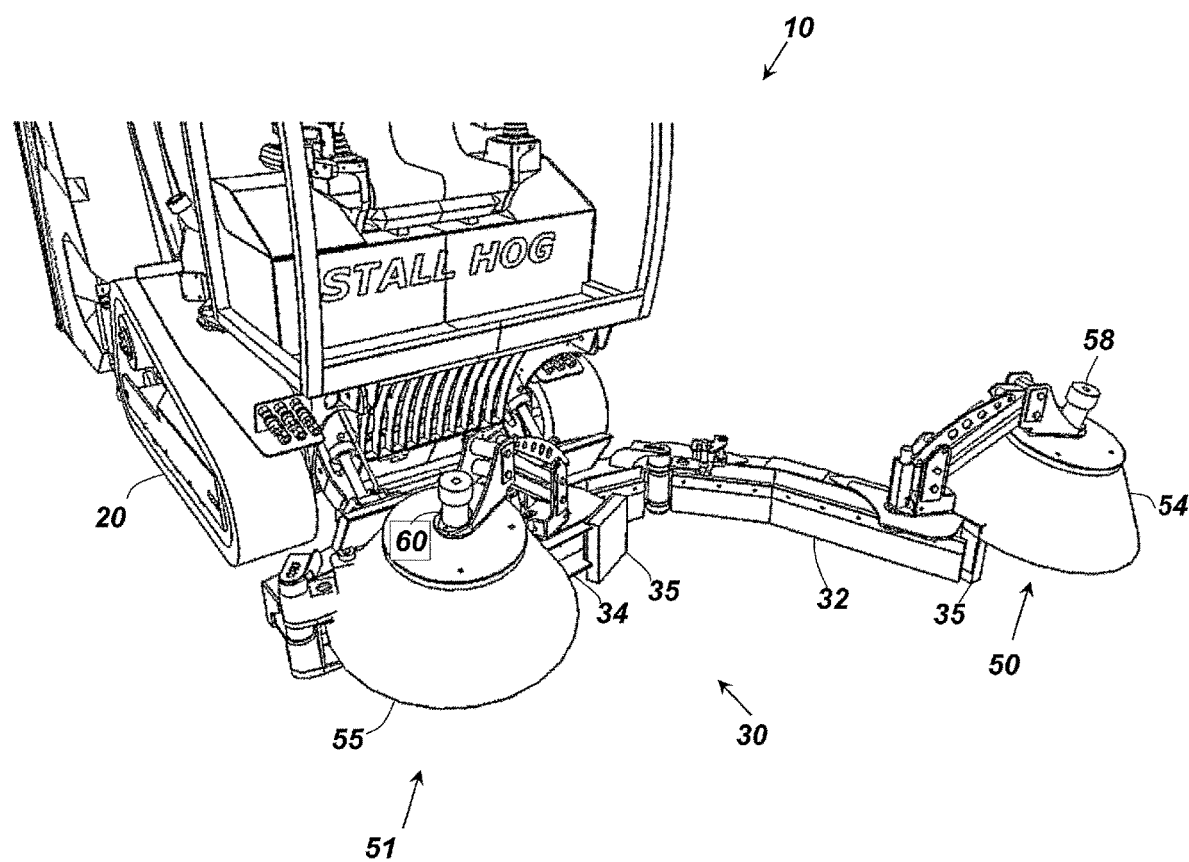
FIG. 6 shows a right front quarter perspective view of the lower portion of the apparatus of FIG. 1, when with the left scraper in a lowered and deployed position, the left rotary brush in a deployed position, the right scraper in a raised and retracted position, and the right scraper in a retracted position.
Figure 7:
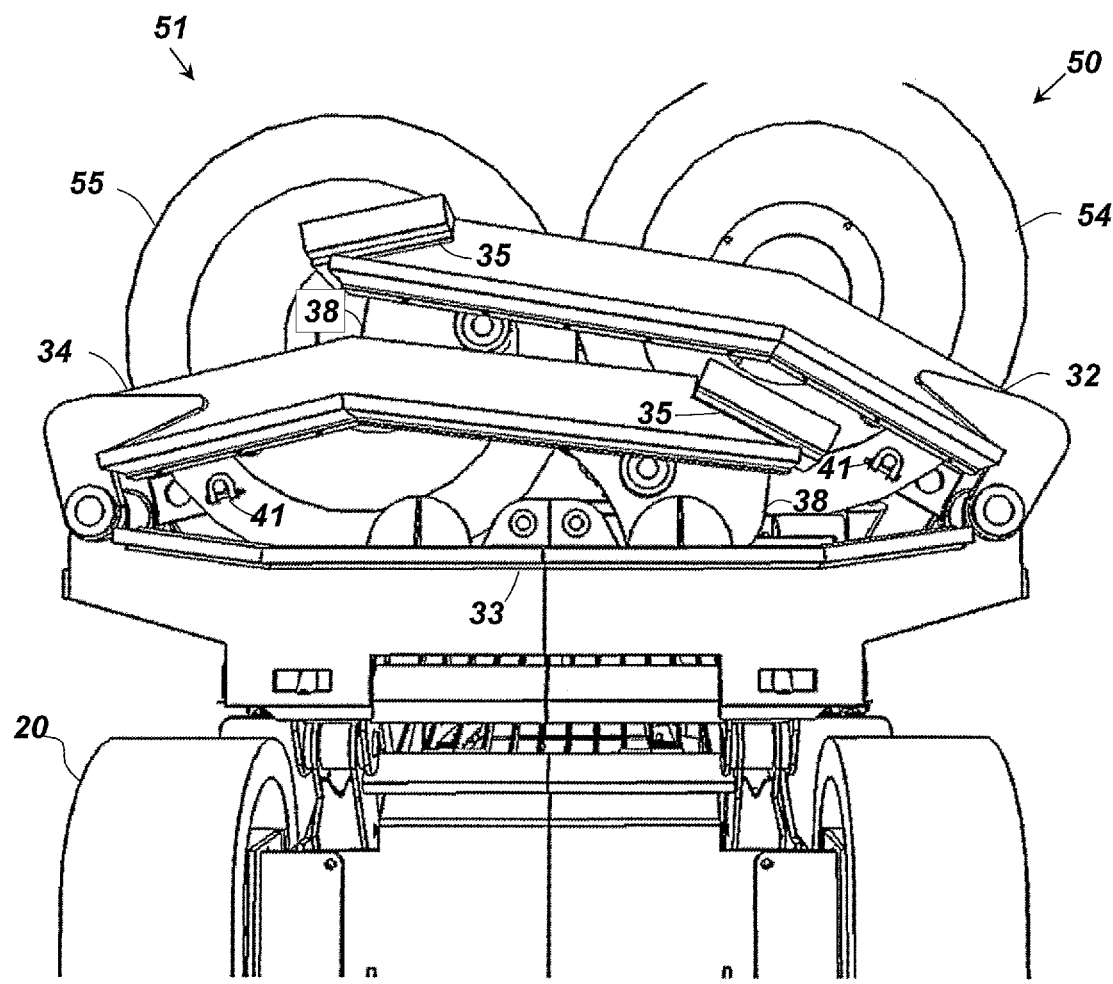
FIG. 7 shows a bottom view of the scraper assembly of the apparatus of FIG. 1, when the left and right scrapers are in raised and retracted positions for transport, and the left and right rotary brushes are in retracted positions for transport.

In FIG. 1, for example, the left scraper (32) and the right scraper (34) are pivoted into deployed positions to increase the effective transverse width of the scraper assembly (30) (i.e., the total width of the central scraper (33), left scraper (32), and right scraper (34), as measured in the transverse direction). This configuration of scrapers may be used when scraping material on the walkway (102) between a pair of stall floors (104, 106) in a tail-to-tail arrangement. The left scraper (32) and right scraper (34) act like whiskers, pulling debris away from the curbs (108, 110). Guards (35), as shown in FIGS. 5 to 7, are attached to the each of the left scraper (32) and the right scraper (34), at their distal ends. These guards (35) are preferably made of a material that is durable, but sufficiently soft to prevent damage to the curbs (108, 110) as they are abraded by the distal ends of the left scraper (32) and right scraper (34). As a non-limiting example, the guards (35) may be made of an ultra-high molecular weight (UHMW) polyethylene plastic.

In FIG. 6, only the left scraper (32) is pivoted into a deployed position, while the right scraper (34) remains in a retracted position. This configuration of scrapers may be used when cleaning the walkway (102) adjacent only a single stall floor (104).

In FIG. 7, both the left scraper (32) and the right scraper (34) are in retracted positions. In this embodiment, the left scraper (32) and the right scraper (34) completely overlap each other and the central scraper (33) in a longitudinal plane, so that the transverse width of the whole scraper assembly (30) approximately matches the transverse width of the vehicle (20). This configuration of scrapers (32 to 34) may be used when maneuvering the vehicle (20) within the walkway (102) or other confined spaces. Tongue-like extensions (38) are attached to each of the left scraper (32) and the right scraper (34), near their distal ends. The extensions (38) vertically overlap with and rest on another part of the scraper assembly (30) so that the distal ends of the left scraper (32) and the right scraper (34) are well supported, even when the rotary brush assemblies (50, 51) are elevated from the floor.

The scraper assembly (30) may include sensors for monitoring the angular position of the scrapers (32, 34). In this embodiment, as shown in FIG. 4, a left angular position sensor (46) and a right angular position sensor (48) are used to detect the angular position of the left scraper (32) and the right scraper (34), respectively. In one embodiment, the angular position sensors (46, 48) are non-contact Hall-effect sensors (e.g., RTP180HVNAA™, Honeywell International Inc.). The angular position sensors (46, 48) and the scraper actuators (e.g., hydraulic cylinder (43)) may be operatively connected to a computerized control system (discussed below) to control the movement of the left scraper (32) and right scraper (34), to prevent them from colliding with each other when as they move between the retracted and deployed positions. For example, the computerized control system may compare the relative angular positions of the left scraper (32) and right scraper (34). If the system detects that the scrapers (32, 34) are being folded into their retracted positions, and the left scraper (32) is closer to its retracted position than is the right scraper (34), then the system may allow the left scraper (32) to fold into its retracted position before the right scraper (34) folds into its retracted position, and reduce the rotation rate of the right scraper (34). Conversely, if the system detects that the scrapers (32, 34) are being folded out towards their deployed positions, and that the right scraper (34) is closer to its deployed position than is the left scraper (32), then the system may allow the right scraper (34) to unfold to a non-interfering position before the left scraper (32) is allowed to unfold towards its deployed position.

Lift assembly for scraper assembly. The scraper assembly (30) may include a lift assembly for adjusting a vertical position of the scraper assembly (30) in relation to the vehicle (20) and hence the floor. In this embodiment, the apparatus (10) includes a pair of lift hydraulic cylinders for adjusting the vertical position of the scraper assembly (30) between a raised position (FIG. 8A) and a lowered position (FIG. 8B). The raised position is used when the scraper assembly (30) is in transport or turning, while the lowered position is used when the scraper assembly (30) is cleaning the floor. A left lift hydraulic cylinder (49) is attached to the left bracket (21) that attaches to the central scraper (33) and the left scraper (32). Similarly, a right lift hydraulic cylinder (not shown) is attached to the right bracket (22) that attaches to the central scraper (33) and the right scraper (34).

Figure 8A:
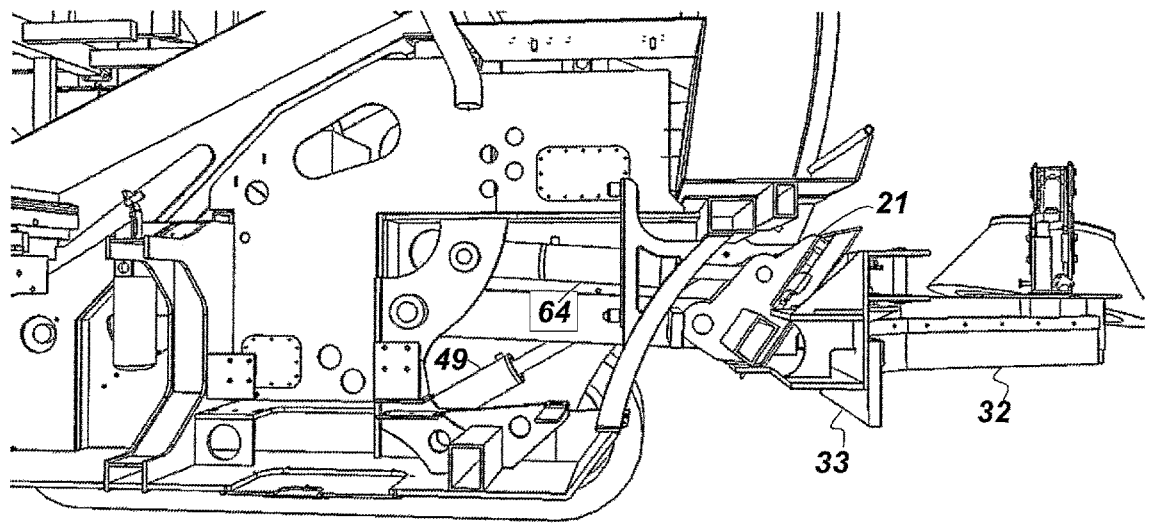
FIGS. 8A and 8B show a right side elevation view of a left portion of a lift assembly associated with a left portion of the scraper assembly of the apparatus of FIG. 1, as viewed from a medial plane of the apparatus, when the left portion of the scraper assembly is in a raised position and a lowered position, respectively.
Figure 8B:
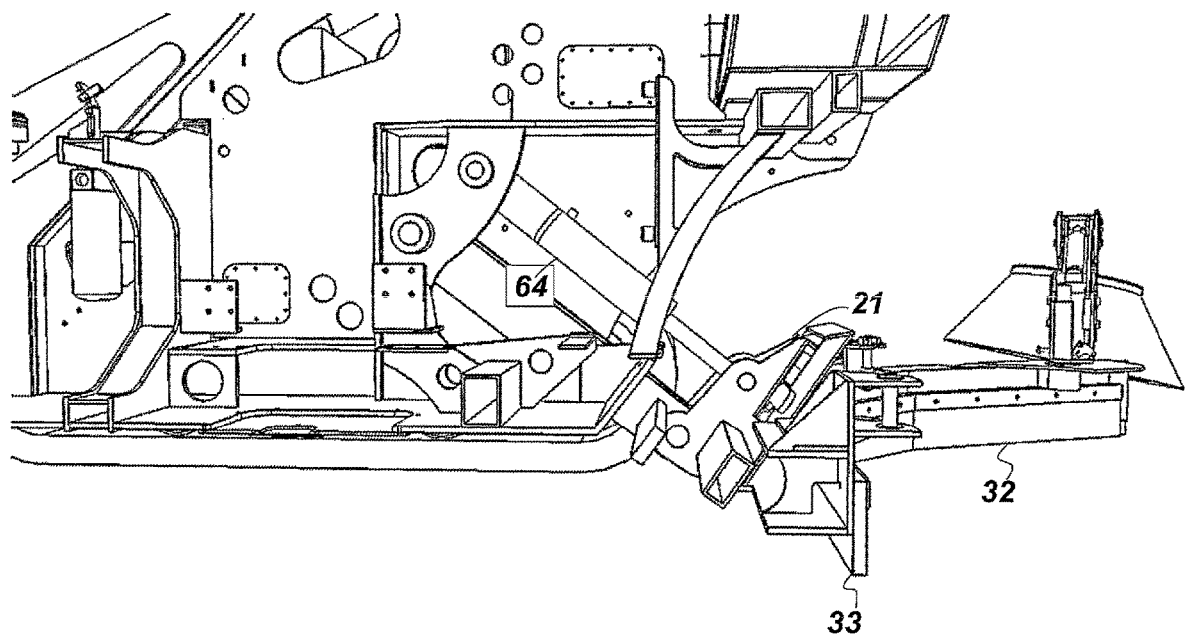

In the embodiment shown in FIGS. 8A and 8B, the scrapers (32 to 34) remain in a constant, substantially vertical orientation, regardless of their vertical position. As shown in FIG. 4, the apparatus (10) includes a left and right tilt hydraulic cylinder (64, 65), which are pivotally attached to left and right brackets (21, 22), respectively. Referring to FIGS. 8A and 8B, as the left lift hydraulic cylinder (49) retracts to lower the scrapers (32, 33), the left tilt hydraulic cylinder (64) retracts to pull backwards on the upper end of the left bracket (21) to maintain the vertical orientation of the scrapers (32, 33). Similarly, as the right lift hydraulic cylinder retracts to lower the scrapers (33, 34), the right tilt hydraulic cylinder (65) retracts to pull backwards on the upper end of the right bracket (22) to maintain the vertical orientation of the scrapers (33, 34).

Figure 9:
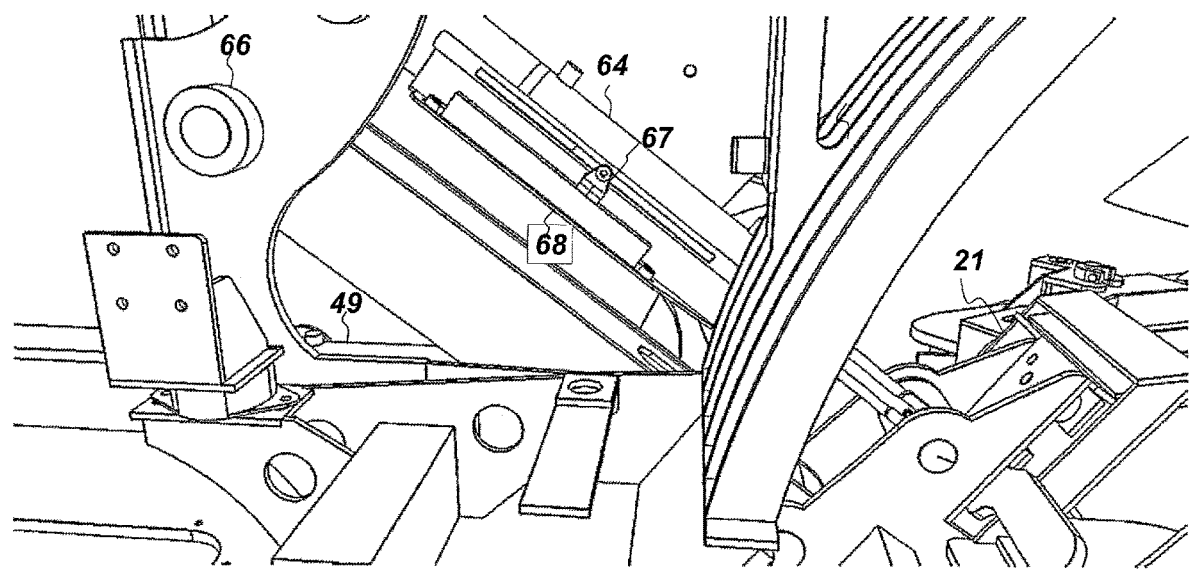
FIG. 9 shows a detailed right side elevation view of a left portion of the lift assembly shown in FIGS. 8A and 8B, when the left portion of the scraper assembly is in the lowered position.

The scraper assembly (30) may include sensors for monitoring the vertical position of the scrapers (32 to 34) and orientation of the scrapers (32, 34). In the embodiment shown in FIG. 9, a lift angle sensor (66) detects the lift angle created by the lift hydraulic cylinders. In one embodiment, the lift angle sensor (66) is a non-contact Hall-effect sensor (e.g., RTP180HVNAA™, Honeywell International Inc.). A linear position sensor (68) detects the extension of the lift hydraulic cylinders. In one embodiment, the linear position sensor is a non-contact Hall-effect sensor (e.g., SPS-L225-HDLS™, Honeywell International Inc.). The lift hydraulic cylinders (49), the tilt hydraulic cylinders (64, 65), the lift angle sensor (66) and the linear position sensor (68) are operatively connected to a computerized control system (described below) in the operator cab (24). Using the computerized control system, an operator can control the extension and retraction of lift hydraulic cylinders. The computerized control system receives signals from the lift angle sensor (66) and the linear position sensor (68), and based on those signals, controls the extension and retraction of the tilt hydraulic cylinders (64, 65) to maintain the scrapers (32 and 34) in a substantially vertical orientation as their elevation changes.

Figure 15:
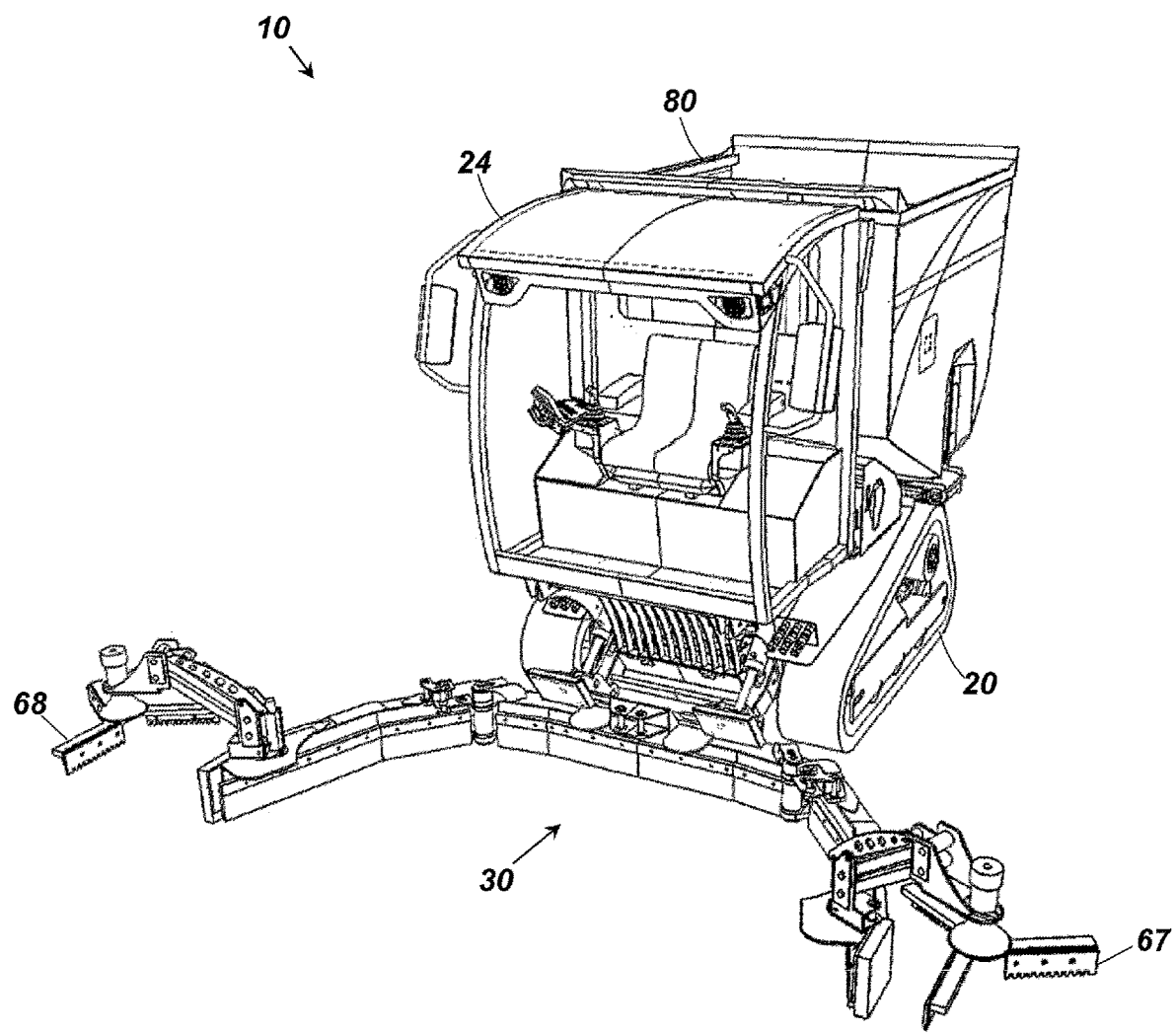
FIG. 15 shows a left front quarter perspective view of another embodiment of an apparatus of the present invention, with cleaning heads in the form of sand rakes.

Cleaning head assembly. In the embodiment shown in FIG. 1, the cleaning head assemblies are in the form of a left rotary brush assembly (50) associated with the left scraper (32), and a right rotary brush assembly (51) associated with the right scraper (34). Each rotary brush assembly (50, 51) includes a rotary brush (54, 55) for moving material on the floor, and an attached arm (52, 53) that pivotally attaches the rotary brush (54, 55) to the associated scraper (32, 34). The rotary brush (54, 55) may be in a variety of materials and forms, suited to the nature of the floor to be cleaned and the waste material on the floor. In the embodiment shown in FIG. 1, for example, the rotary brush (54, 55) has flexible, elongate, bristles made of a synthetic material such as nylon. The bristles collectively have the shape of a frustrum. In other embodiments, a cleaning head assembly may have a cleaning head in other forms, such as a broom, a mop, a pad or a disc, as described above. For example, in another embodiment shown in FIG. 15, the cleaning heads are in the form of rigid sand rakes (67, 68).

In this embodiment, each of the rotary brushes (54, 55) rotates about substantially vertical axes to sweep material from the floor. In other embodiments, the rotary brushes (54, 55) may rotate about substantially horizontal axes. Actuators, such as hydraulic rotary actuators (58, 60), are provided to rotate the rotary brushes (54, 55) relative to their associated arms (52, 53). The computerized control system is operatively connected to the rotary brush actuators (58, 60) to allow an operator to control rotation of the rotary brushes (54, 55), and may allow for variable control of their rotational speed.

Each arm (52, 53) extends horizontally from an arm proximal end to an arm distal end. The distal end is attached to the associated rotary brush (54, 55). The arm proximal end is pivotally attached to the associated scraper (32, 34) for adjusting a transverse position of the aim distal end and the attached rotary brush (54, 55) in relation to the scraper (32, 34). In the embodiment shown in FIG. 1, the arm proximal ends are attached to the scrapers (32, 34) between the scraper proximal end and the scraper distal end, but closer to the scraper distal end. In the embodiment shown in FIG. 5, a first arm actuator for the left arm (52) is provided in the form of a hydraulic linear actuator (e.g., hydraulic cylinder (56)) that has a proximal end attached to a pin connection (61) of the left scraper (32), and a distal end pivotally attached to a pin connection (62) of the left arm (52). Extension or retraction of the hydraulic cylinder (56) causes pivoting of the arm (52) about a substantially vertical axis into a retracted position (as shown in FIG. 7), in which the arm (52) is substantially collinear with their associated scrapers (32). This results in a compact configuration of the scraper assembly, with limited adverse effect on the maneuverability of the vehicle (20). A first arm actuator for the right arm (not shown for clarity) is similarly attached to a pin connection of the right scraper (34) and a pin connection of the right arm (53) to effect pivoting of the right arm (53) in relation to the right scraper (34). In other embodiments, other types of first arm actuators may be used. For example, in an alternative embodiment, the first arm actuators may comprise hydraulic rotary actuators or electromechanical motors. The computerized control system is operatively connected to the first arm actuators to allow an operator to control pivoting of the arms (52, 53) about the vertical axes, and hence the transverse positions of the associated rotary brushes (54, 55).

Each arm proximal end may be pivotally attached to the associated scraper (32, 34) for adjusting a vertical position of the arm distal end and the attached rotary brush (54) in relation to the scraper (32, 34). Second arm actuators, such as a hydraulic cylinder (57) as shown in FIG. 5, may be used to pivot the arms (52, 53) about substantially horizontal axes. In other embodiments, other types of second arm actuators may be used. For example, in an alternative embodiment, the second arm actuators may comprise hydraulic rotary actuators or electromechanical motors. The rotary brushes (54, 55) are pivotally attached to the arms (52, 53) so that the orientation of the rotary brushes (54, 55) remain relatively constant for engagement with the floor, despite changes in the orientation of the arms (52, 53). The computerized control system may be operatively connected to the second arm actuators to allow an operator to control pivoting of the arms (52, 53) about the horizontal axes, and hence the vertical positions of the associated rotary brushes (54, 55). This allows the apparatus (10) to clean stall floors (104, 106) having different heights of curbs (108, 110).

Figure 10:
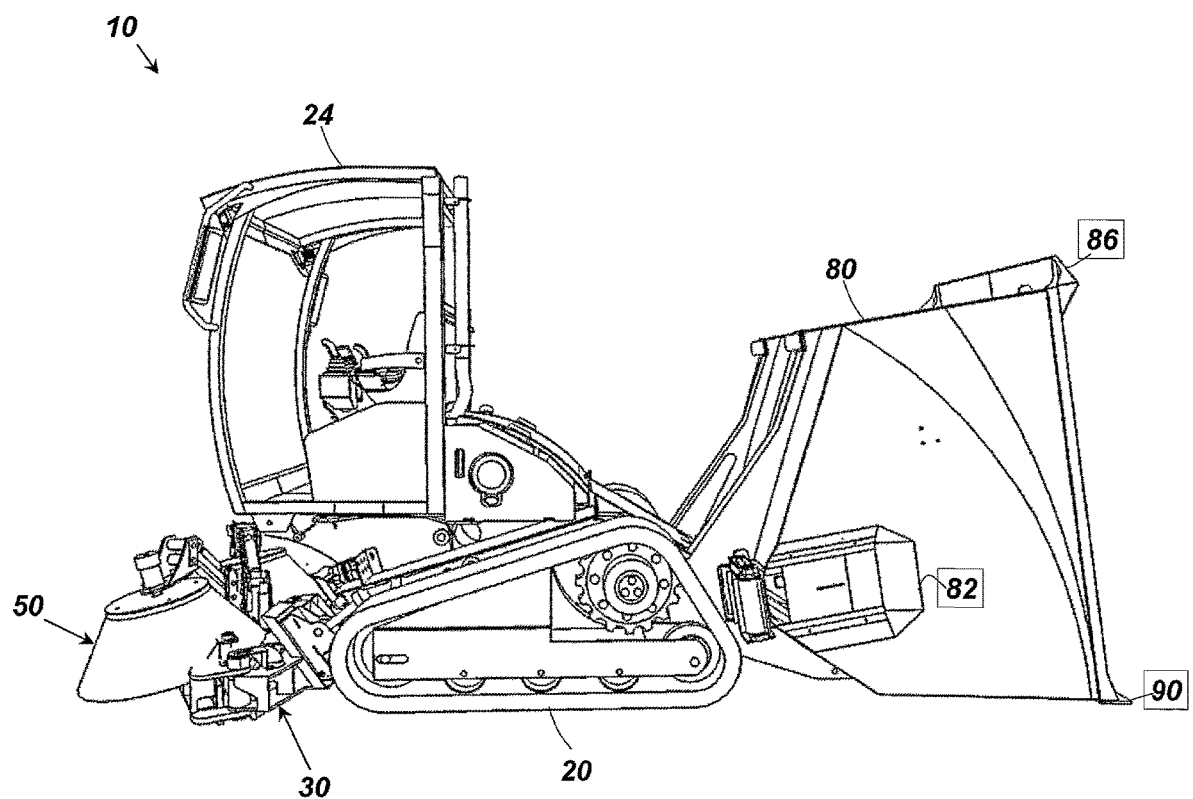
FIG. 10 shows a left side elevation view of the apparatus of FIG. 1, with the hopper in a horizontal orientation.
Figure 11:
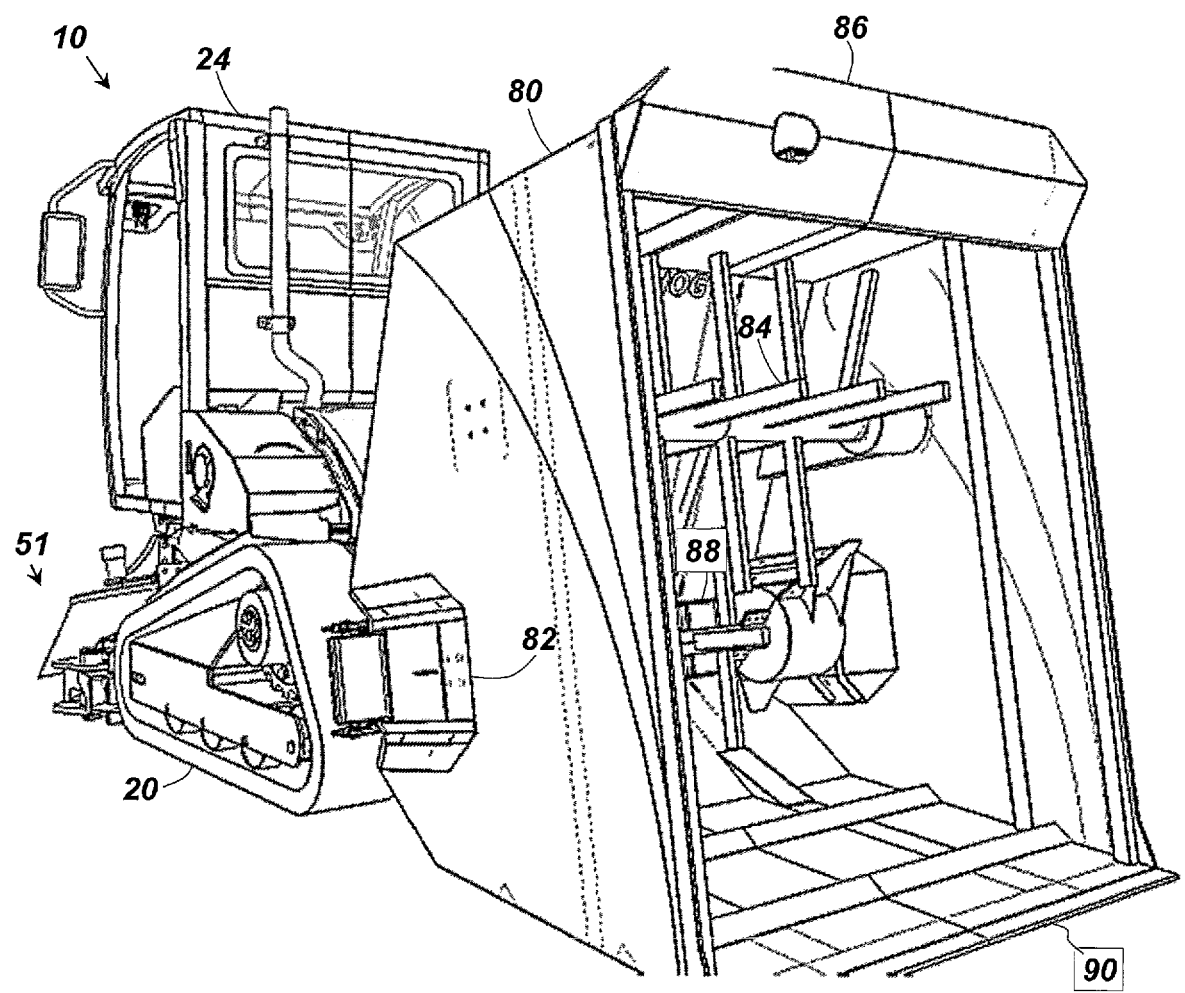
FIG. 11 shows a left rear quarter perspective view of the apparatus of FIG. 1, with the hopper in a horizontal orientation.

Hopper assembly. In this embodiment, the apparatus (10) include a hopper assembly. A hopper (80) may be used for storing bedding material (e.g., woodchips, sawdust, compost, manure, sand) to be distributed on the floor through one or more discharge chutes (82) of the hopper (80). In the embodiment shown in FIG. 1, the hopper (80) is attached to the rear of the vehicle (20), and defines a pair of discharge side-discharge doors (82) on opposite transverse sides of the hopper (80). As shown in FIG. 11, this embodiment of the hopper assembly also includes a rotating spreader (84) inside the hopper (80), and a high-speed conveyor belt system (88) that includes a pair of conveyor belts, one of which discharges bedding material in the hopper (80) out through the left discharge door (82), and one of which discharges bedding material in the hopper (80) out through the right discharge door (82), The hopper (80) is pivotally attached to the vehicle (20) so that the orientation of the hopper (80) can be adjusted between a substantially horizontal orientation as shown in FIG. 1, and a substantially vertical orientation as shown in FIGS. 10 and 11. In this embodiment, when the hopper (80) is in the horizontal orientation, the rear wall (90) of the hopper (80) abuts against the ground, so that the hopper (80) can be used like a bucket attachment to load bedding material into the hopper (80), by reversing the vehicle (20) towards a pile of the bedding material. A shroud (86) is attached to the front of the hopper (80) to prevent bedding material from spilling between the operator cab (24) of the vehicle (20) and the hopper (80), when the hopper (80) is moved to its vertical orientation.

Figure 12:
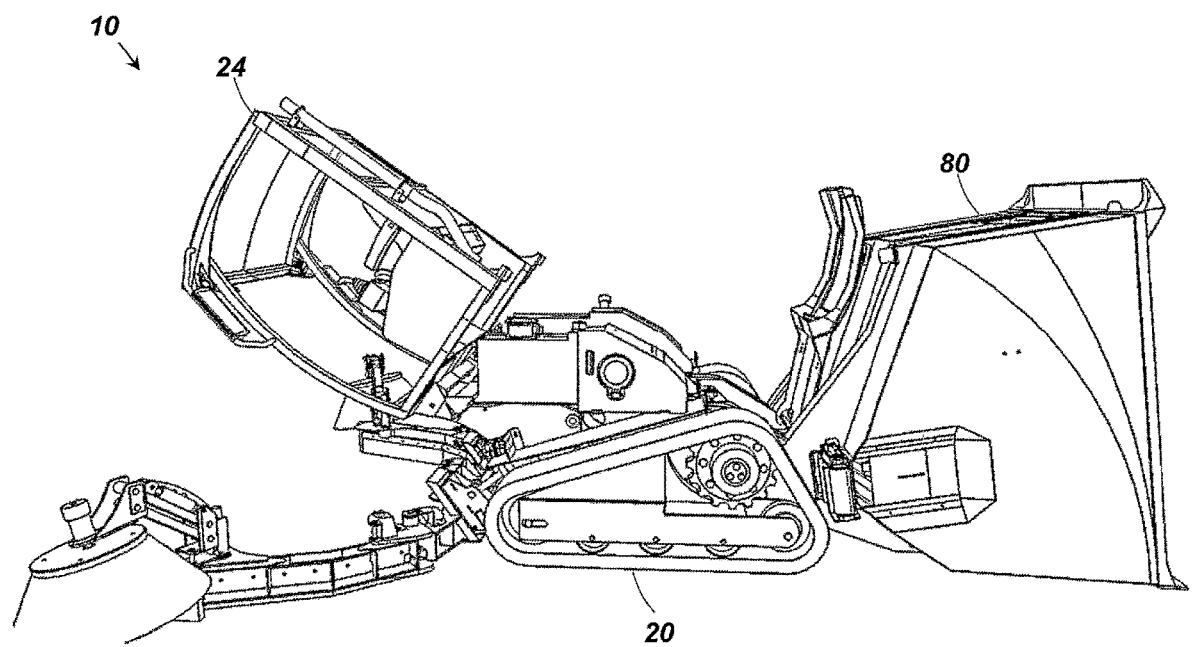
FIG. 12 shows a left side elevation view of the apparatus of FIG. 1, with the hopper in a horizontal orientation, and the operator cab in a horizontal orientation.
Figure 13:
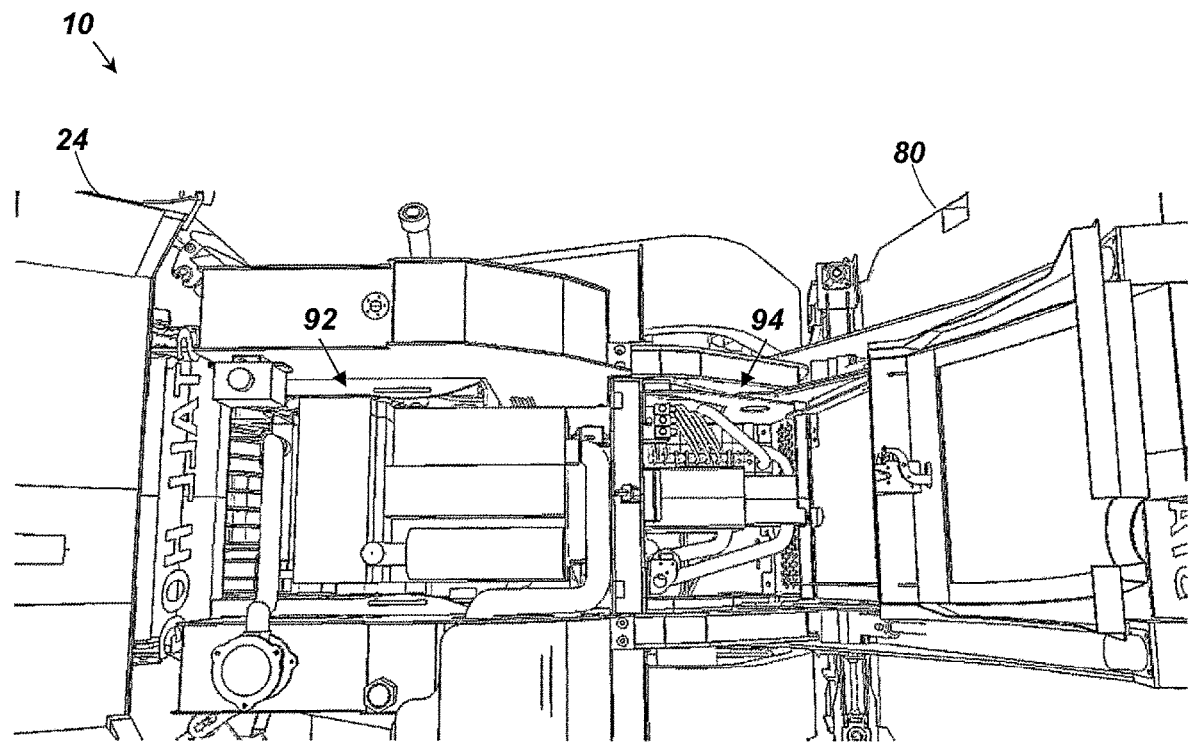
FIG. 13 shows a top plan view of a portion of the apparatus of FIG. 1, with the hopper in a horizontal orientation, and the operator cab in the horizontal orientation.

Access to powertrain and hydraulic systems. In this embodiment, the operator cab (24) of the vehicle (20) is pivotally attached to the remainder of the vehicle (20) so that the orientation of the operator cab (24) can be adjusted between a substantially horizontal vertical orientation as shown in FIGS. 10 and 11, and a substantially horizontal orientation as shown in FIGS. 12 and 13. When both the operator cab (24) and the hopper (80) are in their horizontal orientations as shown in FIG. 13, this allows for top access to a compartment holding the vehicle's powertrain and cooling components (92) (e.g., a diesel engine, a diesel tank, oil reservoir, oil cooler, radiator, fan, air filter, battery), the hydraulic system components (94) (e.g., hydraulic pump, and valves), which provide power to the vehicle (20) and the hydraulic actuators of the apparatus (10). A hydraulic manual pump (not shown) may be provided to actuate movement of the operator cab (24) and the hopper (80) between their horizontal and vertical orientations, even if the powered hydraulic system components (94) are inoperable.

Figure 14:
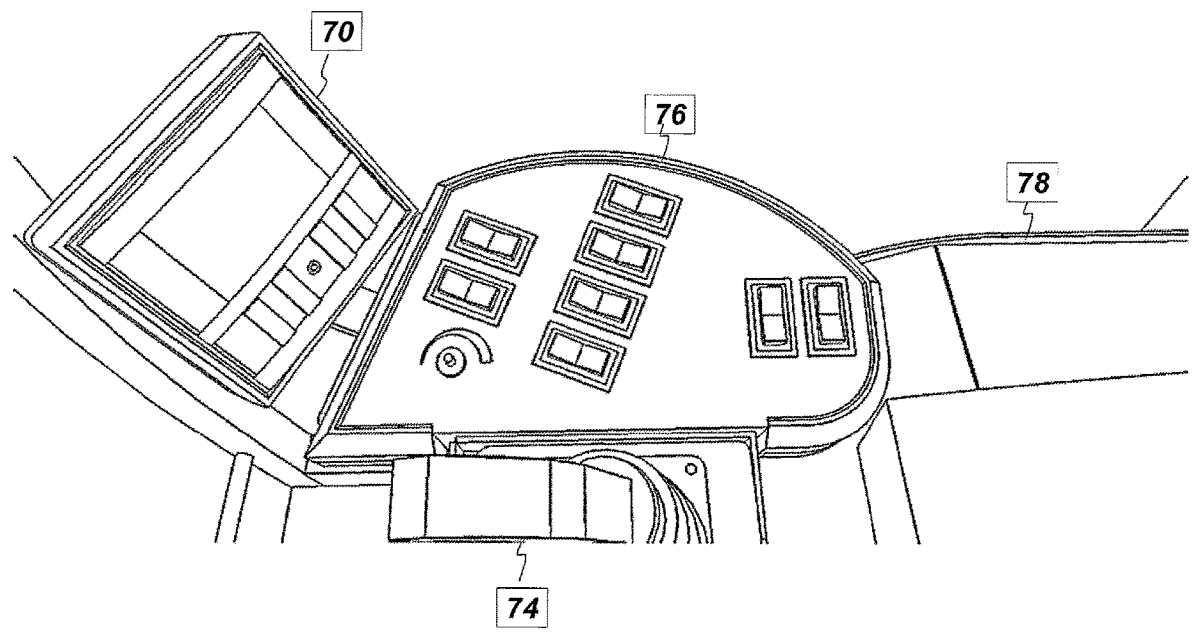
FIG. 14 shows a view of control system of the apparatus of FIG. 1.

Computerized control system. In this embodiment, the apparatus (10) includes the computerized control system. In one embodiment, as shown in FIG. 14, the computerized control system includes a programmable logic controller (PLC) (e.g., a PLUS+1™ vehicle controller; from Danfoss A/S, Nordborg, Denmark), operatively connected to a display device (70) (e.g., an LCD monitor), a pair of joysticks (72, 74) (e.g., JS7000™ joysticks; Danfoss A/S), and a control panel (76) with numerous switches. The PLC is protected in a compartment under a cover (78). The display device (70) displays readouts of operating parameters of the apparatus, service timers, and error messages. The left joystick (72) can be moved to steer, advance, and reverse the vehicle (20), and has a plurality of buttons for controlling the actuator for pivoting the left scraper (32), the actuators for pivoting and driving the left rotary brush assembly (50), and the conveyor belt that discharges bedding material in the hopper (80) out through the left discharge door (82). The right joystick (74) can be moved to control the lift assembly that raises and lowers the scraper assembly (30), and has a plurality of buttons for controlling an actuator that pivots the hopper (80), the actuator for pivoting the right scraper (34), the actuators for pivoting and driving the right rotary brush assembly (51), and the conveyor belt that discharges bedding material in the hopper (80) out through the right discharge door (82). The switches on the control panel (76) control a variety of functions such as starting and stopping the vehicle (20), and the speed of the vehicle's engine. In one embodiment, one of the switches actuates a mode in which the engine speed is automatically increased (e.g., from 1800 rpm to 2600 rpm) when the rotary brush assemblies (50, 51) are actuated to compensate for the additional load of the rotary brush assemblies (50, 51) on the engine of the vehicle.

Use and operation. The use and operation of the apparatus (10) shown in the Figures for cleaning a barn floor is now described. It will be understood, however, that the apparatus (10) is not limited for use with a barn floor as described, and may be used to clean other types of floors having different configurations.

As shown in FIG. 1, the barn floor includes a lower portion that provides a walkway (102) for dairy cows, disposed between a left elevated portion and a right elevated portion that provide a left stall floor (104) and a right stall floor (106), respectively, in a "tail-to-tail" arrangement. The left stall floor (104) and the right stall floor (104) intersect the walkway (102) to faun a left curb (108) and a right curb (110), respectively.

As shown in FIG. 1, the vehicle (20) is positioned approximately in the center of the walkway (102). The scraper assembly (30) is lowered in relation to the vehicle (20) so that the lower edge of the scraper assembly (30) engages the walkway (102). The left scraper (32) and right scraper (34) are pivoted so that their respective scraper distal ends abuts the left curb (108) and the right curb (110), respectively. The arms (52, 53) are pivoted about the vertical axes in relation to their associated scrapers (32, 34) to transversely align the associated rotary brushes (54, 55) with the rear portion of the stall floors (104, 106). If necessary, the arms (52, 53) are also pivoted about the horizontal axes in relation to their associated scrapers so that the rotary brushes (54, 55) are in contact with the rear portion of the stall floors (104, 106). When doing so, it may be desirable for the arms (52, 53) to apply a downward pressure on the rotary brushes (54, 55) against the stall floors (104, 106) to enhance their cleaning action. With the scrapers (32 to 34) and rotary brushes (54, 55) so positioned, the vehicle (20) is moved longitudinally forward so that the scrapers (32 to 34) scrape the walkway (102). Simultaneously, the rotary brushes (54, 55) are rotated to sweep material (e.g., bedding material contaminated with cow excrement, milk, and urine) from rear portion of the stall floors (104, 106), onto the walkway (102) into a position longitudinally in front of the advancing scrapers (32 to 34). For example, in FIG. 1, from the perspective of an operator in the operator cab (24) of the vehicle (20), the left rotary brush (54) rotates in a clockwise direction to sweep bedding material transversely from the stall floor (104) onto the walkway (102) in front of the scraper assembly (30), while the right rotary brush (55) rotates in a counter-clockwise direction to sweep bedding material transversely from the stall floor (106) onto the walkway (102) in front of the scraper assembly (30).

When it is desired to turn the vehicle (20) within the limited space of the barn, to store the vehicle (20), or to use the vehicle (20) for distributing bedding material, the pivoting movement of the arms (52, 53), the pivoting movement of the scrapers (32, 34), and the vertical movement of the scraper assembly (30), as described above may be reversed, so that the apparatus (10) assumes a compact configuration as shown in FIG. 7.

If the apparatus (10) is to be used for distributing bedding material (e.g., straw, sawdust, or straw) on the stall floors (104, 106), then the hopper (80) may be pivoted into the horizontal orientation as shown in FIGS. 10 and 11 to facilitate loading of the bedding material into the hopper (80) by reversing the hopper (80) into a stock pile of bedding material. The hopper (80) is then pivoted into the vertical orientation as shown in FIG. 1, the discharge doors (82) are opened, the spreader (82) is rotated within the hopper (80), and the conveyor (88) is actuated to discharge the bedding material in the transverse directions onto the stall floors (104, 106) as the vehicle (20) moves in the longitudinal direction.

If the powertrain system components (92) or hydraulic system components (94) need to be serviced, both the hopper (80) and the operator cab (24) may be pivoted into their horizontal orientations as shown in FIGS. 12 and 13, to provide top access to the compartments in which these components are housed.

Interpretation. References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50, 51" percent can in some embodiments carry a variation from 45 to 55 percent. For integer ranges, the term "about"

can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The corresponding structures, materials, acts, and equivalents of all means or steps plus function elements in the claims appended to this specification are intended to include any structure, material, or act for performing the function in combination with other claimed elements as specifically claimed.

The invention claimed is:

1. An apparatus for cleaning a floor, the apparatus attached or attachable to a vehicle that defines a horizontal longitudinal direction of travel, and a horizontal transverse direction perpendicular to the longitudinal direction, the apparatus comprising:
   (a) a scraper assembly comprising at least one horizontally extending scraper for scraping material on the floor, wherein when the apparatus is attached to the vehicle, the scraper is pivotable in relation to the vehicle for adjusting a transverse position of an end of the scraper in relation to the vehicle; and
   (b) for at least one scraper, an associated cleaning head assembly comprising:
      (i) a cleaning head that is actuable for moving material on the floor from a position transversely offset from the scraper assembly to a position transversely aligned with and longitudinally in front of the scraper assembly; and
      (ii) a horizontally extending arm attaching the cleaning head to the scraper such that pivoting of the scraper in relation to the vehicle adjusts a transverse position of the cleaning head in relation to the vehicle, and wherein the arm is pivotally attached to the scraper for adjusting a transverse position of the cleaning head in relation to the scraper.

2. The apparatus of claim 1, wherein the at least one scraper comprises a left scraper and a right scraper, wherein the left and right scrapers are pivotable in relation to the vehicle to position the end of the left scraper and the end of the right scraper transversely on opposite sides of the vehicle.

3. The apparatus of claim 2, wherein the left and right scrapers are pivotable in relation to the vehicle to at least partially overlap the left and the right scraper in a longitudinal plane.

4. The apparatus of claim 2, wherein the scraper assembly further comprises a central scraper, wherein the left scraper and the right scraper are pivotable in relation to the vehicle by being pivotally attached to the central scraper.

5. The apparatus of claim 1, wherein the arm is pivotable into substantially collinear alignment with the scraper in a vertical plane.

6. The apparatus of claim 1, wherein the cleaning head comprises a rotary brush.

7. The apparatus of claim 1, wherein the apparatus further comprises, for each of the at least one scraper, a scraper actuator for pivoting the scraper in relation to the vehicle for adjusting the transverse position of the end of the scraper in relation to the vehicle, wherein the scraper actuator comprises an electrically, hydraulically, or pneumatically powered mechanical device.

8. The apparatus of claim 1, wherein the apparatus further comprises, a first arm actuator for pivoting the arm in relation to the attached scraper for adjusting the transverse position of the cleaning head in relation to the scraper, wherein the first arm actuator comprises an electrically, hydraulically, or pneumatically powered mechanical device.

9. The apparatus of claim 1, wherein the arm is pivotally attached to the scraper for adjusting a vertical position of the cleaning head in relation to the scraper.

10. The apparatus of claim 9, wherein the apparatus further comprises a second arm actuator for pivoting the arm in relation to the scraper for adjusting the vertical position of the cleaning head in relation to the scraper, wherein the second arm actuator comprises an electrically, hydraulically, or pneumatically powered mechanical device.

11. The apparatus of claim 1, wherein when the apparatus is attached to the vehicle, the scraper assembly is movable in relation to the vehicle for adjusting a vertical position of the scraper assembly in relation to the floor.

12. The apparatus of claim 11, wherein the apparatus further comprises a scraper assembly actuator for moving the scraper assembly in relation to the vehicle for adjusting the vertical position of the scraper assembly in relation to the floor, wherein the scraper assembly actuator comprises an electrically, hydraulically, or pneumatically powered mechanical device.

13. The apparatus of claim 1, wherein when the apparatus is attached to the vehicle, the scraper assembly and the cleaning head assembly are positioned longitudinally in front of an operator cab of the vehicle.

14. A method for cleaning a floor, the method comprising the steps of:
   (a) providing an apparatus attached to a vehicle defining a horizontal longitudinal direction of travel, and a horizontal transverse direction perpendicular to the longitudinal direction, wherein the apparatus comprises:
      (i) at least one elongate scraper for scraping material on the floor; and
      (ii) for at least one scraper: a cleaning head actuable for moving material on the floor from a first position transversely offset from the scraper assembly to a second position transversely aligned with and longitudinally in front of the scraper assembly; and an arm attaching the cleaning head to the scraper;
   (b) pivoting the at least one scraper in relation to the vehicle to adjust a transverse position of an end of the scraper and to adjust a transverse position of the cleaning head in relation to the vehicle;

(c) pivoting the arm in relation to the scraper to adjust a transverse position of the cleaning head in relation to the scraper; and (d) actuating the cleaning head to sweep material on the floor from the first position to the second position, and moving the vehicle in the longitudinal direction so that the scraper scrapes material on the floor at the second position.

15. The method of claim 14, wherein the cleaning head comprises a rotary brush.

16. The method of claim 14, wherein the step of pivoting the at least one scraper is performed to abut the end of the scraper with a curb formed by an intersection of a lower portion of the floor surface and an elevated portion of the floor.

17. The method of claim 16, wherein the step of pivoting the arm in relation to the scraper is performed to align the cleaning head with the elevated portion of the floor.

18. The method of claim 14, wherein the at least one scraper comprises a left scraper and a right scraper.

19. The method of claim 18, wherein the method further comprises pivoting the left scraper and the right scraper to at least partially overlap each other in a longitudinal plane.

20. The method of claim 14, wherein the method further comprises pivoting the arm into substantially collinear alignment with the scraper in a vertical plane.

21. The method of claim 14, wherein the method further comprises pivoting the arm in relation to the scraper to adjust a vertical position of the cleaning head in relation to the floor.

22. The method of claim 14, wherein the method further comprises adjusting a vertical position of the scraper in relation to the floor.

* * * * *